Aug. 4, 1925.
R. D. PIKE
1,548,279
PROCESS FOR REDUCING SULPHIDE ORES WITH IRON
Filed July 8 1924
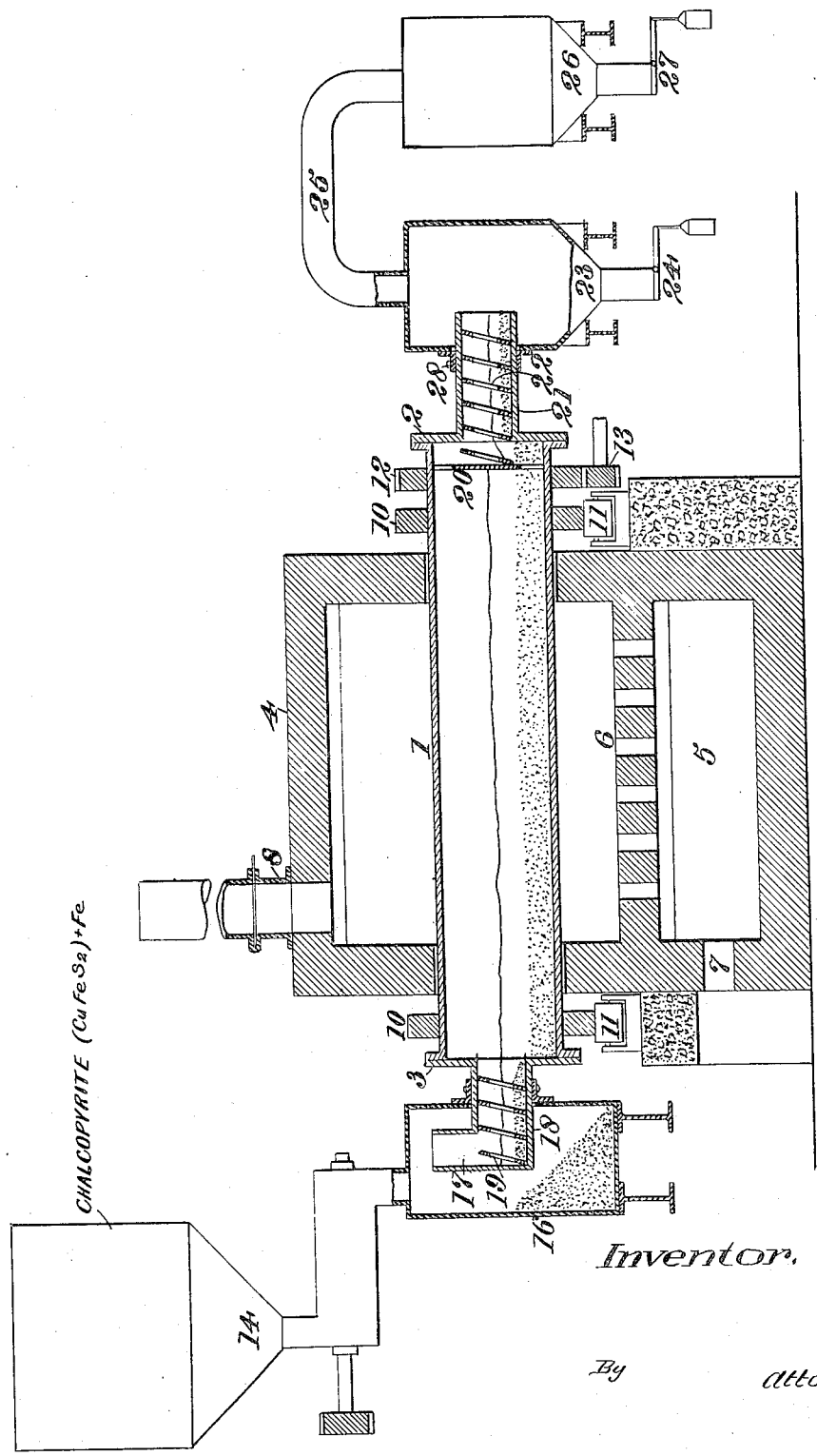
Inventor.
By         Attorney.

Patented Aug. 4, 1925.

1,548,279

UNITED STATES PATENT OFFICE.

ROBERT D. PIKE, OF SAN MATEO, CALIFORNIA.

PROCESS FOR REDUCING SULPHIDE ORES WITH IRON.

Application filed July 8, 1924. Serial No. 724,799.

*To all whom it may concern:*

Be it known that I, ROBERT D. PIKE, a citizen of the United States, residing at San Mateo, in the county of San Mateo and State of California, have invented certain new and useful Improvements in Processes for Reducing Sulphide Ores with Iron, of which the following is a specification.

It is well known that when certain natural sulphides are heated to red heat with air excluded a portion of the sulphur is distilled off and a certain molecular rearrangement takes place whereby new sulphides are found, which are more reactive chemically than the original natural minerals.

My present invention relates to a process or method for rendering this reaction more complete and rapid by mixing with the natural sulphide a relatively small proportion of iron, preferably in the form of sponge iron. This iron acts as a reducing agent and combines with the sulphur vapor present to form ferrous sulphide; and as this latter reaction reduces the partial pressure of sulphur vapor, the main reaction, which results in the decomposition of the natural sulphides into new sulphides and sulphur vapor, is permitted to proceed more vigorously and at a lower temperature than would be the case if the iron were not present. Iron in any form tends to combine with sulphur vapor, but the reaction proceeds much more rapidly with sponge iron at moderate temperature than with any other form of iron, because of the open porous structure of the sponge iron. My invention contemplates carrying out the reaction at moderate temperatures of, for example, 500° C. to 700° C., which are considerably below the melting point of any of the sulphides which are formed, and sponge iron is the preferable reagent to employ for reduction at these moderate temperatures.

If the sulphide mineral which is to be decomposed be chalcopyrite, the following equation probably represents a close approximation of the net reactions which occur $$2CuFeS_2 (\text{Chalcopyrite}) + Fe + heat = 2FeS + Cu_2S + FeS$$

and similar equations can be written for other sulphide minerals, which liberate sulphur upon being treated in a reducing or neutral atmosphere.

In the following I present for description and not for limitation a method for carrying out my invention as applied to a chalcopyrite concentrate. However, my invention is not restricted to any particular form of sulphide mineral or to any form of iron used as a reducing agent, but is intended to cover as broadly as may be permitted by the present state of the art a process or method for reducing sulphide minerals by treating with iron at temperatures below the fusing point. My invention likewise contemplates the formation of the sponge iron in one operation with the reduction of the sulphide mineral which may be accomplished by mixing with the sulphide mineral in subdivided form an oxide of iron, likewise in subdivided form, together with enough carbon to effect a reduction of the iron oxide to sponge iron, and heating the mixture with agitation in a reducing atmosphere to about 900° C.

The figure illustrates a longitudinal section of a furnace suitable for carrying out my process when applied to a pulverized mixture of chalcopyrite concentrate and sponge iron.

A rotatable drum is shown as 1. This drum is preferably made of chrome iron or calorized steel for withstanding the action of sulphur vapors at a red heat. The discharge end of the drum is closed by a head 2 of like material and attached to the drum by any suitable means not shown, and the feed end is closed by a similar head 3. The drum is rotatably mounted in furnace 4, provided with fire box 5, perforated arch 6, burner 7, stack 8, damper 9. Tires 10 are secured to the drum and are rotatably supported in cradle 11. Rotary motion is imparted by pinion 13 through girth gear 12.

The pulverized mixture of chalcopyrite containing about 10% by weight of sponge iron is fed into feed box 14, and transported by a closed screw to box 16, whence it is picked up by radial feeder 17, which rotates with the drum. The radial feeder drops the material into the tubular extension 18, which is attached to 3 and is provided with interior conveyor flights 19, which move the feed into the rotating drum 1. The feed then progresses through the drum until it is picked up by radial passages 20 and dropped into the tubular extension 21, which is provided with interior conveyor flights 22, which move the material and drop it into chute 23 from which it is discharged through balanced gate 24. Any sulphur fumes which have not been combined with the iron escape through pipe 25 into sulphur condenser 26, whence they are discharged through balanced gate 27. Running joints 28 and 29 of any suitable design are provided to exclude air from within the drum 1 and to prevent escape therefrom of sulphur vapor.

In practice the metal of the drum is maintained at about 800° C. and from one to two hours is sufficient to complete the reaction.

The reduced chalcopyrite is highly reactive chemically and the copper and silver contents thereof are rapidly and completely dissolved in a boiling hot solution containing an excess of ferric chloride.

It will be apparent that the above described method can be continuously carried out in the embodiment of apparatus disclosed, and it is to be understood that the present application is not limited to a batch method or process.

Having thus described my invention, what I claim as new and desire to protect by Letters Patent is:—

1. The process of treating relatively inert sulphide minerals for increasing their chemical reactivity which consists in heating them with iron to a temperature below their fusion point.

2. The process of treating relatively inert sulphide minerals for increasing their chemical reactivity which consists in heating them with iron to a temperature below their fusion point in a substantially oxygen free atmosphere.

3. The process of treating sulphide minerals for increasing their chemical reactivity which consists in mixing them with sponge iron and heating the mixture to a point below the melting point.

4. The process of treating relatively inert sulphide minerals for increasing their chemical reactivity which consists in mixing them with sponge iron and heating the mixture to a point below the melting point in a substantially oxygen free atmosphere.

5. The method of treating sulphides of copper and iron for increasing their chemical reactivity which consists in mixing the minerals with iron and heating the mixture to a temperature ranged between 500° and 800° C.

6. The method of treating sulphides of copper and iron for increasing their chemical reactivity which consists in mixing the minerals with iron and heating the mixture to a temperature ranged between 500° and 800° C. in a substantially oxygen free atmosphere.

7. The method of treating sulphides of copper and iron for increasing their chemical reactivity which consists in subjecting the pulverized mixture of sulphide mineral and sponge iron to a temperature ranged between 500° and 800° C. in a substantially oxygen free atmosphere.

In testimony whereof I have signed my name to this specification.

ROBERT D. PIKE.